United States Patent [19]

Neufeld

[11] Patent Number: 5,974,438
[45] Date of Patent: Oct. 26, 1999

[54] SCOREBOARD FOR CACHED MULTI-THREAD PROCESSES

[75] Inventor: E. David Neufeld, Tomball, Tex.

[73] Assignee: Compaq Computer Corporation, Houston, Tex.

[21] Appl. No.: 08/775,144

[22] Filed: Dec. 31, 1996

[51] Int. Cl.[6] .................................................. G06F 9/00
[52] U.S. Cl. .......................................... 709/104; 711/144
[58] Field of Search ..................................... 395/650, 200, 395/457, 677, 800.01, 670, 673, 674; 711/144, 133, 135; 709/103, 104, 107, 100; 712/1

[56] References Cited

U.S. PATENT DOCUMENTS

| | | | |
|---|---|---|---|
| 5,261,053 | 11/1993 | Valencia | 395/200 |
| 5,287,508 | 2/1994 | Hejna, Jr. et al. | 395/650 |
| 5,317,738 | 5/1994 | Cochcroft, Jr. et al. | 395/650 |
| 5,379,428 | 1/1995 | Belo | 395/650 |
| 5,437,032 | 7/1995 | Wolf et al. | 395/650 |
| 5,630,130 | 5/1997 | Perotto et al. | 395/677 |
| 5,701,432 | 12/1997 | Wong et al. | 395/457 |
| 5,717,926 | 2/1998 | Browning et al. | 395/674 |
| 5,745,778 | 4/1998 | Alfieri | 395/800.01 |

Primary Examiner—Alvin E. Oberley
Assistant Examiner—Yveste G. Cherubin
Attorney, Agent, or Firm—Paul Katz Frohwitter

[57] ABSTRACT

A computer system comprising at least one processor and associated cache memory, and a plurality of registers to keep track of the number of cache memory lines associated with each process thread running in the computer system. Each process thread is assigned to one of the plurality of registers of each level of cache that is being monitored. The number of cache memory lines associated with each process thread in a particular level of the cache is stored as a number value in the assigned register and will increment as more cache memory lines are used for the process thread and will decrement as less cache memory lines are used. The number value in the register is defined as the "process thread temperature." Larger number values indicate warmer process thread temperature and smaller number values indicate cooler process thread temperature. Process thread temperatures are relative and indicate the cache memory line usage by the process threads running in the computer system at a particular level of cache. By keeping track or "score" of the number values (temperatures) in each of these registers called "scoreboard registers," the scheduler algorithm of the computer operating system may objectively determine the most advantageous order for the process threads to run and which of the processors in a multi-processor system should execute these process threads. A scoreboard register may be reassigned to a new process thread when its associated process thread has been discontinued.

14 Claims, 6 Drawing Sheets

FIG. 6

SCOREBOARD FOR CACHED MULTI-THREAD PROCESSES

BACKGROUND OF THE INVENTION

1. Field of the Invention

The present invention relates to cache memory utilization in a single or multi-processor computer system, and more particularly in determining the order of execution of multiple program process threads and the association of computer processors therewith.

2. Description of the Related Technology

Use of computers in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology computers. A significant part of the ever increasing popularity of the computer, besides its low cost relative to just a few years ago, is its ability to run multiple application programs which appear to the user to be running concurrently. In a multi-processor computer system some of the application programs may run concurrently.

These application programs may be word processing, spreadsheet, database, graphics, computer aided design and engineering, and telecommunications to name a few. In the computer system there is a software operating system ("OS") that controls the functions of the computer processor(s) and peripheral components which make up the computer system. The OS program includes routines or an algorithm called a "scheduler" that decides which application program(s) is running on a processor(s), and what application program(s) will be running next.

The scheduler algorithm defines each part of the application program that is being executed on a processor as a "process" or "process thread." When a process thread is interrupted for what ever reason, the register values and unexecuted instructions of that process thread are saved and the scheduler tells the processor to restore the register values from a different process and start execution of another process thread. This is called a "Context Switch." In a multiprocessor computer system, multiple process threads may be executed on the multiple processors at the same time. However, only one process thread can run on one processor at any given time. Multiple processors can run multiple process threads up to the number of processors running concurrently in the computer system. The application programs can appear to the user to be running concurrently because the processor(s) switch(es) between the different threads very quickly, thus giving the impression that the application programs are running simultaneously.

The processor or plurality of processors in a computer system run in conjunction with a high capacity, low-speed (relative to the processor speed) main memory, and a low capacity, high-speed (comparable to the main memory speed) cache memory or memories (one or more cache memories associated with each of the plurality of processors).

Cache memory is used to reduce memory access time in mainframe computers, minicomputers, and microprocessors. The cache memory provides a relatively high speed memory interposed between the slower main memory and the processor to improve effective memory access rates, thus improving the overall performance and processing speed of the computer system by decreasing the apparent amount of time required to fetch information from main memory.

In today's single and multi-processor computer systems, there is typically at least one level of cache memory for each of the processors. The latest microprocessor integrated circuits may have a first level cache memory located in the integrated circuit package and closely coupled with the central processing unit ("CPU") of the microprocessor. Additional levels of cache may also be implemented by adding fast static random access memory (SRAM) integrated circuits and a cache controller. Typical secondary cache size may be any where from 64 kilobytes to 8 megabytes and the cache SRAM has an access time comparable with the processor clock speed.

In common usage, the term "cache" refers to a hiding place. The name "cache memory" is an appropriate term for this high speed memory that is interposed between the processor and main memory because cache memory is hidden from the user or programmer, and thus appears to be transparent. Cache memory, serving as a fast storage buffer between the processor and main memory, is not user addressable. The user is only aware of the apparently higher-speed memory accesses because the cache memory is satisfying many of the is requests instead of the slower main memory.

Cache memory is smaller than main memory because cache memory employs relatively expensive high speed memory devices, such as static random access memory ("SRAM"). Therefore, cache memory typically will not be large enough to hold all of the information needed during program execution. As a process executes, information in the cache memory must be replaced, or "overwritten" with new information from main memory that is necessary for executing the process thread. The information in main memory is typically updated each time a "dirty" cache line is evicted from the cache memory (a process called "write back"). As a result, changes made to information in cache memory will not be lost when new information enters cache memory and overwrites information which may have been changed by the processor.

Information is only temporarily stored in cache memory during execution of the process thread. When process thread data is referenced by a processor, the cache controller will determine if the required data is currently stored in the cache memory. If the required information is found in cache memory, this is referred to as a "cache hit." A cache hit allows the required information to be quickly retrieved from or modified in the high speed cache memory without having to access the much slower main memory, thus resulting in a significant savings in program execution time. When the required information is not found in the cache memory, this is referred to as a "cache miss." A cache miss indicates that the desired information must be retrieved from the relatively slow main memory and then placed into the cache memory. Cache memory updating and replacement schemes attempt to maximize the number of cache hits, and to minimize the number of cache misses.

Information from main memory for a process thread is typically stored in "lines" of cache memory which contain a plurality of bytes or words from the main memory such as, for example, 16, 32 or 64 bytes of information. The plurality of bytes from main memory are stored sequentially in a line of cache memory. The cache memory comprises a plurality of lines of information that may store information for a plurality of process threads. Each line of cache memory has an associated "tag" that stores the physical addresses of main memory containing the information in the cache line as well as other things such as "MESI" state information for the cache line. From the example above, if 16 bytes of information are stored in a cache line, the least significant 4 bits of the physical address of main memory are dropped from the main memory address stored in the tag register. In addition, the tag register may contain a cache consistency protocol such as "MESI" (Modified, Exclusive, Shared and Invalid) to ensure data consistency in a multi-processor or bus master environment.

A cache memory is said to be "direct mapped" if each byte of information can only be written to one place in the cache memory. The cache memory is said to be "fully associative" if a byte of information can be placed anywhere in the cache memory. The cache memory is said to be "set associative" if a group of blocks of information from main memory can only be placed in a restricted set of places in the cache memory, namely, in a specified "set" of the cache memory. Computer systems ordinarily utilize a variation of set associative mapping to keep track of the bytes of information that have been copied from main memory into cache memory.

The hierarchy of a set associative cache memory resembles a matrix. That is, a set associative cache memory is divided into different "sets" (such as the rows of a matrix) and different "ways" (such as the columns of a matrix). Thus, each line of a set associative cache memory is mapped or placed within a given set (row) and within a given way (column). The is number of columns, i.e., the number of lines in each set, determine the number of "ways" of the cache memory. Thus, a cache memory with four columns (four lines within each set) is deemed to be "4-way set associative."

Set associative cache memories include addresses for each line in the cache memory. Addresses may be divided into three different fields. First, a "block-offset field" is utilized to select the desired information from a line. Second, an "index field" specifies the set of cache memory where a line is mapped. Third, a "tag field" is used for purposes of comparison. When a request originates from a processor for new information, the index field selects a set of cache memory. The tag field of every line in the selected set is compared to the tag field sought by the processor. If the tag field of some line matches the tag field sought by the processor, a "cache hit" is detected and information from the block is obtained directly from or modified in the high speed cache memory. If no match occurs, a "cache miss" occurs and the cache memory is typically updated. Cache memory is updated by retrieving the desired information from main memory and then mapping this information into a line of the set associative cache. When the "cache miss" occurs, a line is first mapped with respect to a set (row), and then mapped with respect to a way (column). That is, the index field of a line of information retrieved from main memory specifies the set of cache memory wherein this line will be mapped. A "replacement scheme" is then relied upon to choose the particular line of the set that will be replaced. In other words, a replacement scheme determines the way (column) where the line will be located. The object of a replacement scheme is to select for replacement the line of the set that is least likely to be needed in the near future so as to minimize further cache misses.

Several factors contribute to the optimal utilization of cache memory in computer systems: cache memory hit ratio (probability of finding a requested item in cache), cache memory access time, delay incurred due to a cache memory miss, and time required to synchronize main memory with cache memory (write back or write through). In order to minimize delays incurred when a cache miss is encountered, as well as improve cache memory hit rates, an appropriate cache memory replacement scheme is used.

Set associative cache memory replacement schemes may be divided into two basic categories: non-usage based and usage based. Non-usage based replacement schemes, which include first in, first out ("FIFO") and "random" replacement schemes, make replacement selections on some basis other than memory usage. The FIFO replacement scheme replaces the line of a given set of cache memory which has been contained in the given set for the longest period of time. The random replacement scheme randomly replaces a line of a given set.

Usage based schemes, which include the least recently used ("LRU") replacement scheme, take into account the history of memory usage. In the LRU replacement scheme the least recently used line of information in cache memory is overwritten by the newest entry into cache memory. An LRU replacement scheme assumes that the least recently used line of a given set is the line that is least likely to be reused again in the immediate future. An LRU replacement scheme thus replaces the least recently used line of a given set with a new line of information that must be copied from main memory.

Regardless of the replacement scheme used, the scheduler algorithm will decide what process thread will be executed next in a single processor computer. In a multi-processor computer system, the scheduler algorithm decides what process threads are to run concurrently, and which processor will execute each of these process threads. The scheduler then determines the next appropriate process thread to be executed, etc. The scheduler may cause the process threads to be executed in order of occurrence, or the order of execution may be determined by some software or hardware priority paradigm. The scheduler cannot determine, however, what the likely cache hit or miss outcome will be during execution of any given process thread. Some operating systems use a concept called "Strong Affinity" when scheduling threads. "Strong Affinity" schedulers attempt to execute a thread on the same processor it last ran on. The reason for doing this is because the same processor's cache is more likely to contain data that is relevant to the process than some other processor in the system.

What is needed is a method and apparatus to improve the likelihood of cache hits during execution of a process thread. It is desired to improve the computer system efficiency by having the scheduler algorithm make an informed decision on which program thread would be most appropriate to run next and on what processor. In addition, it is desired to improve usage of cache memory by selecting locations to be written to that contain no longer needed process thread information.

OBJECTS OF THE INVENTION

It is therefore an object of the present invention to improve the efficiency of a computer system by keeping track of the number of cache memory lines containing information for each of the active process threads.

It is a further object of the present invention to assign a counter to each process thread running in the computer system and increment or decrement this counter each time a cache memory line is used to store information for the process thread or forced out from the cache associated with the counter, respectively.

It is a further object to provide the scheduler algorithm with the number of cache memory lines storing information for each process thread.

It is a further object to select the next process thread to run based on the number of cache memory lines having information for that process thread.

It is a further object to select a certain processor in a multiprocessor computer system to run a certain process thread based on the number of cache memory lines having information for that certain processor and that certain process thread.

It is a further object to use the relative amount of retained data in cache memory or "cache temperature" (cache temperature more fully described hereinafter) of a process in conjunction with other information to assist the scheduler algorithm in making a more informed decision which process to dispatch next on a processor.

It is a further object of the present invention to have a plurality of counters, each of the plurality of counters associated with a process thread running in the computer system. When a cache memory line is written to for a certain process thread, increment the associated counter. When a cache memory line containing information for that certain process thread is over-written by data for another process thread, decrement the associated counter.

It is a further object to compare the number of cache memory lines used while a process thread was running with the number of cache memory lines remaining that still have information for that process thread and to select the next process thread to be run based on the thread having a high percentage of remaining cache memory lines containing information for the process thread.

It is a further object that cache temperatures of different process threads can be used to assist the scheduler algorithm make a better decision about the order that the different process threads should be executed in order to minimize "cache thrashing."

It is a further object that cache temperatures of different process threads can be used to detect processes that heavily use the same locations in the cache memory and more efficient operation of the computer system may be benefited by isolating these processes to different processors.

It is a further object to normalize cache temperature on a per process basis to assist the scheduler algorithm make a better decision about which process to schedule next and to determine what processor a process might be scheduled upon.

It is a further object of the present invention to over-write the cache memory lines containing information of a discontinued process thread before over-writing the cache memory locations of running process threads. Even if this is the most recently used (MRU) line in the set.

It is an object of the present invention that system performance can be increased by varying the duty cycle at which various process threads are executed. Process threads that cause a lot of cache evictions (cache thrashing) to occur can be run more optimally by allowing them to run less often but for a longer period of time.

SUMMARY OF THE INVENTION

The above and other objects of the present invention are satisfied, at least in part, by providing a plurality of counter/registers that may be associated with each process thread under the control of a scheduler algorithm in the operating system software of a computer system. An embodiment of the present invention utilizes a plurality of counter/registers that are associated with the process threads that are presently active in the computer system. Initially when a first process thread is assigned by the scheduler algorithm to be executed on a processor, cache memory lines are filled with data and instructions ("information") for that first process thread. Each time a memory line of the cache memory is used to store information for the first process thread, the present invention will increment a numerical value stored in an associated first register. When a second process thread is scheduled to be executed, its information is stored in the cache memory and a numerical value stored in a second register associated with the second process thread is incremented according to the number of cache memory lines used for the second process thread. This goes on for each process thread running in the computer system. Thus, a register associated with a process thread contains the number of cache memory lines used to store information for that process thread. When a cache line belonging to a particular process thread is over-written the associated counter for that process thread is similarly decremented. The number of cache memory lines used to store information for a running first process thread may be different from the number of cache memory lines storing information for that first process thread when it is not running. This is so because other running process threads, i.e., second, third, fourth, etc., may require some of the same cache locations used by the first process thread, thus reducing the number of cache lines containing information for the first process thread. When the first process thread runs again, the number of cache memory lines containing information for the first process thread may or may not be substantially reduced depending on the cache memory activity of the previously running other process threads. An absolute number of cache memory lines containing information for a process thread may not necessary indicate the comprehensiveness and completeness of that information. One process may only use a small amount of information when running while another process may need a substantially greater amount of information when running. Thus the absolute number of cache memory lines are not necessarily indicative of the completeness of the information stored for each process thread. According to the present invention, a relative number or percentage of cache lines containing information for a process thread may be utilized in determining which process thread to next run. When few or none of the cache lines have been over written for a process thread that had previously run, then the relative number or percentage of cache lines remaining for that process thread would be contained in an associated register. The higher this relative number, the greater the amount of information for an associated process thread remains in the cache memory.

In a multi-processor computer system, the scheduler algorithm often assigns which processor is to run a selected process thread. Typically, each processor of the multi-processor computer system will have its own cache memory which may comprise a single or multiple level cache memory system. Thus in a multi-processor system, counter/registers will be assigned to each cache memory associated with a processor and in a multi-level cache memory, counter/registers may be assigned to each level thereof When a process thread runs on more than one processor of a multi-processor computer system, there will be more than one register associated with that process thread (only one register, however, is needed per level of cache memory associated with a processor of the multi-processor computer system for each process thread). Any level of cache in a system can benefit from the addition of these counters. The more levels of cache that have these counters in a system, the more information that is available to the scheduler algorithm to make a better and more informed decision about the execution order and location for process threads. The counter/registers of the present invention are used to indicate how many cache memory lines contain information for each of the process threads running in the computer system, and which processor cache memory (single or multi-level) contains the respective information for each of the process threads.

Hereinafter the aforementioned counter/registers of the present invention will be referred to as "scoreboard registers" and will be used to indicate how "hot" or "cold" the information of a particular process thread is relative to the information of the other process threads in the cache memory. Thus a process thread retaining much of its information in the cache memory will be "hot" as to that cache memory and associated processor. Conversely, another process thread retaining only a small portion of its information in the cache memory will be "cold." The relative "temperature" of a process thread relative to the other active process threads in the computer system may thus be determined by referring to the value in the scoreboard register(s) associated with that process thread. Larger numbered values will typically be "hotter" than smaller numbered values.

If a second process thread uses any of the cache locations previously used by the first process thread, then the first scoreboard register (associated with the first process thread) is decremented by the number of cache memory lines evicted when loading information for the second process thread. In this way, the scoreboard registers keep track of the relative temperature (proportional amount of information stored in cache memory) for each process thread. The scoreboard registers may be associated with the tag fields of each cache memory, i.e., the value of a scoreboard register indicates the number of tag addresses pointing to the cache memory lines containing information of a certain process thread.

According to the present invention, the scheduler algorithm will designate a scoreboard register for each process thread that has run, is running and will be soon running in the computer system. In this way, a "scoreboard map" is created representing the information distribution in each of the cache memories for all process threads that have run or are running. A problem could occur, however, if there are more process threads then available scoreboard registers. The scheduler algorithm could reassign a scoreboard register from a discontinued process thread to a new process thread using a paradigm similar to the LRU cache memory replacement scheme mentioned above. In the event there are not enough counters in the system to address all the processes, the counters could be reused in several different ways. A counter owned by a process that is believed to not use cache locations that will be altered by other processes in the near term could be used. A process that has a 'cold' cache temperature might be able to give up its counter to another process. Other algorithms may similarly be applied.

Whenever a processor in the computer system executes a process thread assigned to it by the scheduler algorithm, information (data and instructions) for the process thread is retrieved from cache memory. There is usually at least one cache memory associated with the processor of a single processor computer system, and at least one cache memory for each processor of a multi-processor computer system. In an embodiment of the present invention for multi-processor computer systems, the scheduler algorithm assigns a scoreboard register for each process thread having information stored in each cache memory of each processor of the multi-processor system. For example, a first process thread is executed in processor A and a second process thread is executed in processor B, then the first process thread continues execution in processor B and the second process thread continues execution in processor C. There will be first process thread information stored in the cache for processor A and the cache for processor B. Likewise, there will be second process thread information stored in the cache for processor B and the cache for processor C. There will also be different numbers at the various levels of the cache hierarchy for each process.

In the preceding example, the scheduler algorithm will have used four scoreboard registers for the first and second process threads because each process thread was executed in two different processors and, thus, information is stored for each of the first and second process threads in two different caches. As the number of processors and non-shared cache levels increase the number of scoreboard registers increase as the product thereof. Therefore, it is preferred that separate temperatures be kept with separate scoreboard registers for the number of lines of information in each cache memory for each process thread. The present invention allows the scheduler algorithm to make decisions based on the relative temperatures of the cache for various threads on a given processor and also gives the scheduler algorithm information that could be used to decide on which processor a thread should be run. This feature also enables the scheduler algorithm to make a better decision about which process thread to execute next, and to have better insight into which processor would be the most advantageous to use in executing the process thread. Also, many programs consist of multiple threads to accomplish their work. The scheduler could keep tract of which execution order of the threads yield the least contention. The operating system could keep this information so that next time the application is used, it has a head start and doesn't need to "learn" this order all over again.

A feature of the present invention is that a finished or discontinued process thread may be flagged with the scoreboard register and the associated cache memory lines of the discontinued process thread may be used immediately in storing information for new process threads. A preferred application of the present invention is to allow the scheduler algorithm to indicate to the cache temperature counters that a particular process is being terminated and that cache lines owned by it can be marked as existing in the 'Invalid' state of the MESI protocol. This would allow the cache controller to automatically reuse cache locations that are not being used by any existing process. This could be accomplished by the cache controller by telling it when to cycle through all the cache lines looking for locations owned by dead processes. This way be accomplished as a background operation.

Still another feature of the present invention allows the scheduler algorithm to re-assign a scoreboard register even though its former process thread information count is not zero. This enables the scheduler to utilize a scoreboard register of a cold process thread for a pending process thread when there are no scoreboard registers otherwise available. It would be preferable to have enough scoreboard registers available that none need to be shared between different processes.

An advantage of the present invention is that the scheduler algorithm has extra information available to make a more informed decision about which task to schedule next and on which processor. This extra information allows the system to make better choices that can be measured as increased throughput and responsiveness of the system.

Another advantage is when a process thread has run on multiple processors in the past, information is available describing the relative cache temperatures on these processors. The scheduler algorithm can determine whether to wait for a busy processor that is associated with the cache having the hottest process thread information or allow an idle processor associated with a cache having a cooler temperature to execute the process thread immediately. This decision may also be based on thread latency, but the present invention allows the scheduler to make a better informed decision as to what processor to use and in what order the process threads should be executed.

The present invention, in a multi-processor environment, may use any or all of the aforementioned embodiments and features, and, in addition, may also enable the scheduler algorithm to quantitatively determine whether to wait for a processor-cache combination that is hot or proceed to another processor-cache combination that is cooler but available. The present invention may accomplish this by comparing the relative temperatures of each process thread between each of the processors in the multi-processor computer system for each of the active process threads. A probabilistic or heuristic approach may be used to decide whether to wait on a hot processor to become available or use a cooler processor that is available.

Other and further objects, features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

The present invention is a method and system for keeping track of the number of cache memory lines used for each active process thread in a computer system and then determining how many of those cache lines have retained the information for each of the process threads after the respective process thread has quit running. The percent of the number of cache memory lines remaining that were used by each process thread may be utilized by the operating system's scheduler algorithm in determining the order of execution of multiple program threads and the association of computer processors therewith. Also, the change in cache temperature for other processes when a particular process is run is of value. If for example you have a process that evicts a lot of information from the cache when it runs, you may not want to run it until other processes have finished. Or you may want to run it for a longer period of time only occasionally. In this case, it would get the same amount of total CPU time, but this type of scheduling would not cause as many cache misses.

The present invention utilizes a plurality of registers to keep track of the number of cache memory lines used to store information for each of the process threads running in the computer system. When a first process thread is running, it requires that a certain amount of information be stored in the cache memory associated with the processor running this first thread. After the processor has executed the first thread for a period of time, the processor will execute subsequent process threads according to the scheduler algorithm. The subsequent process threads also require that information for them be placed in the cache memory of the processor executing these threads. Since the cache memory is of limited storage capacity, some of the cache lines must be reused to store new information when running the subsequent process threads. Thus, information for running subsequent process thread may overwrite information previously stored for a thread that was running previously. In the present invention, the number of cache memory lines used to store information for a particular process thread, typically, will be greatest when that process thread is running. The next time that process thread runs there may be fewer lines of cache memory that store its information because other process threads have subsequently evicted some of the cache locations used by the first process and used some of the cache memory for themselves.

The present invention determines the number of cache lines storing information for each process thread in registers associated with the process threads. When a process thread is running, the number of lines of cache memory storing information for that process thread is placed into a register. When information for that thread is written to additional lines of the cache memory the number in that register is incremented, and when information for another process thread overwrites lines of cache (i.e., uses them for that other process thread) the register is decremented. The absolute number of cache memory lines used to store information for each of the process threads may be stored in registers, each register associated with a process thread. The absolute number of cache lines of information for each process thread may be used to determine which process thread has the greatest "presence" in the cache memory. The scheduler algorithm can use this set of numbers from the respective scoreboard registers in determininig an optimal order of execution of the program threads. However, the number of cache memory lines used to store information for each process thread may not always be indicative of the completeness of information stored in the cache memory for a particular process thread. One process thread may use only a small amount of information and therefor will require relatively few cache memory lines. Another process thread may need a large number of cache memory lines, thus requiring a great deal more of the cache memory. If only the absolute number of cache lines associated with each of these two threads was used, the thread having the largest number in its respective register would always be favored by the scheduler algorithm in determining when to next run that thread. In many applications this suffices and would work well.

Typically, the various levels of cache memory are of different sizes. Everything that is in a higher level of cache is also in the larger, lower levels of the cache. It is noted that various algorithms could be developed that used this information in different ways. For example, one process could have no lines in the L1 cache but everything it needs in the L2. Another process could have some data in the L1 cache but little of anything else it needs in the L2 or L3 caches. The choice of which one is more optimum to execute might depend on how it is desired for the system to respond. One might be chosen for a system that needed to maximize total throughput while the other might be chosen if system responsiveness is an issue. It should be noted that without the present invention no choices are possible based on cache temperature.

Preferably, the number of cache lines used for each process thread can be normalized by remembering what number of cache lines were used when a process thread was running and then see how much information was evicted from the cache lines when the process thread is ready to run again. This may be accomplished by storing the number of lines of cache used by the running process, then decrementing this number whenever a cache line storing the process information is over written. A normalized or percentage value for each of the process threads may be determined by dividing the number of lines of cache determined when the process was last running by the presently remaining number of lines of cache and storing this normalized or percentage value for each process. This percentage value of information which is retained in the cache for each of the process threads hereinafter will be referred as their "temperatures." Using the percentage value of information also takes into account that different process threads will use different amounts of cache memory, and by using the percentage value of cache lines remaining a normalized representation of the temperature of each thread is achieved.

The greater the remaining percentage of cache memory lines used by a process thread, the warmer the process is said to be. By keeping track or "score" of the retained percentage of cache lines for each thread, in registers called "scoreboard registers," a scheduler algorithm of the computer operating system may objectively determine the most advantageous process thread to next run and which processor should execute this next process thread. In addition, the scheduler can learn and adapt to interaction between various threads. Different threads are going to cause the eviction of different lines of information stored in the cache memory. Running threads in different orders will cause more or less evictions to occur. This is especially true in a multi-processor system. For example, running a particular thread may cause every cache line storing information for other threads to be evicted (i.e., information for the running particular thread fills the entire cache memory). This will result in a hot temperature for this particular thread, but all of the other threads would have cold temperatures. Better cache temperatures for the other threads will be maintained if this cache memory intensive thread is isolated to its own processor/cache memory. That would minimize its impact on the cache temperatures for the other threads.

Figure 1:
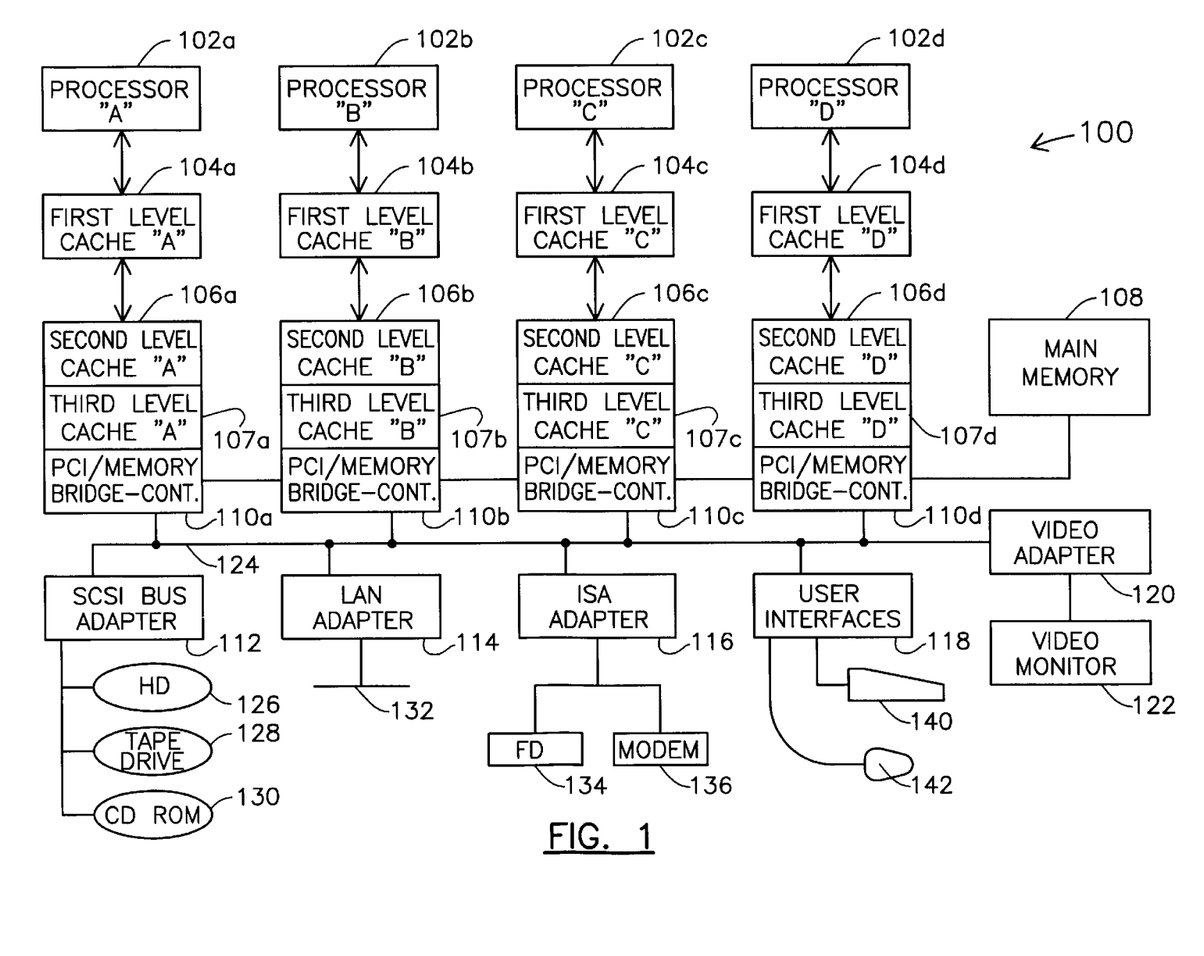
FIG. 1 is a schematic block diagram of a multi-processor computer system.

Referring now to the drawings, the details of preferred embodiments of the present invention are schematically illustrated. Like elements in the drawings will be represented by like numbers, and similar elements will be represented by like numbers with a different lower case letter suffix. Referring to FIG. 1, a schematic block diagram of a multi-processor computer system is illustrated. The multi-processor computer system is generally indicated by the numeral 100 and comprises processors 102a–d, first level caches 104a–d, second level caches 106a–d, third level caches 107a–d, main memory 108, PCI/memory bridges and cache controllers 110a–d, SCSI adapter 112, LAN adapter 114, ISA adapter 116, user interface 118, video adapter 120, video monitor 122, PCI bus 124, hard disk 126, tape drive 128, CD ROM drive 130, local area network 132, floppy disk 134, telephone modem 136, keyboard 140 and a cursor pointing device (mouse) 142. The computer system 100 illustrates multi-processors 102a–d and three levels of cache memory 104, 106 and 107 for each processor 102. The present invention is equally applicable to a single processor or multi-processor computer system, each processor having one or more caches. The present invention contemplates and includes multiple level caches having have score board registers associated with each cache level. The different levels of cache may have different temperatures on a per process basis.

Figure 2:
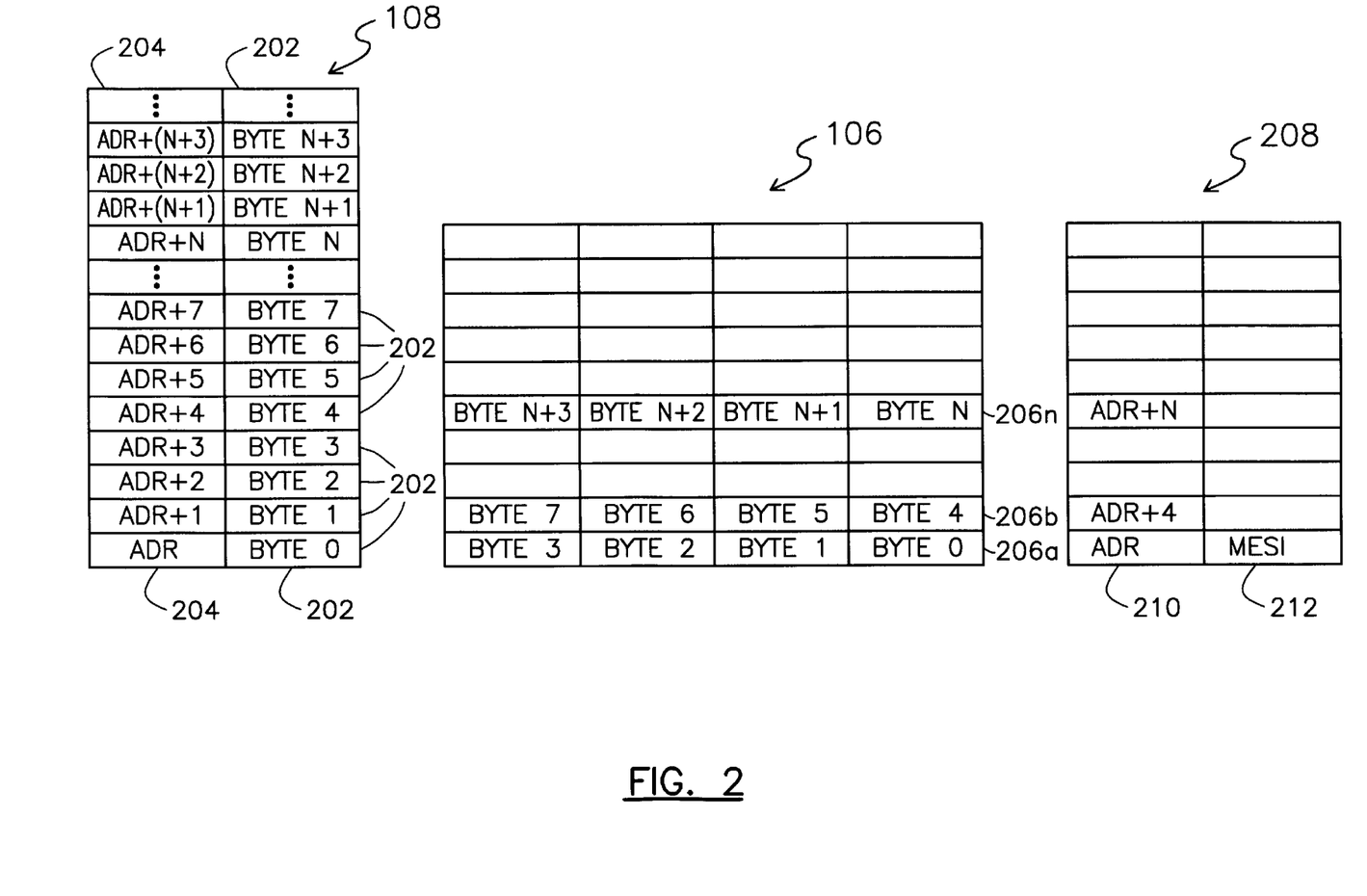
FIG. 2 is a conceptual diagram of the information stored in main memory and cache memory of the computer system of FIG. 1.

Referring to FIG. 2, a conceptual diagram of the information stored in main memory 108 and cache memory 106 of the computer system 100 is illustrated. The information 202 is stored in the main memory 108 in byte form (eight bits of information) at physical addresses 204. A line 206 of the cache memory 106 is loaded with information 202 relating to a process thread. The line 206 may contain a plurality of bytes (4, 8, 16, 32, 64 etc.) of information 202 from the main memory 108. The cache block 106 of FIG. 2 illustrates four bytes stored in the line 206, different lines in multiples of the four bytes per line are illustrated as lines 206a, 206b and 206n and correspond to the respective information bytes 202 of the main memory 108.

A tag block 208 stores a corresponding physical address 210 of the bytes stored in the line 206 and a MESI status 212 for the line 206. Each process thread is associated with at least one cache line 206. The physical address 210 stored in the tag block 208 has its least significant bits truncated as appropriate for the number of bytes stored in the line 206, for example as illustrated, four bytes are stored in the cache line 206, thus, the two least significant bits would be truncated from the actual physical address of the main memory 108. So long as the cache controller and processor find the required information in the cache lines 206 (a cache hit) all that is required is the upper address bits. Each of the lines 206 contain data and instruction information for each of the active process threads in the computer system 100. The cache block 106 illustrated is called a single "set" cache.

Figure 3:
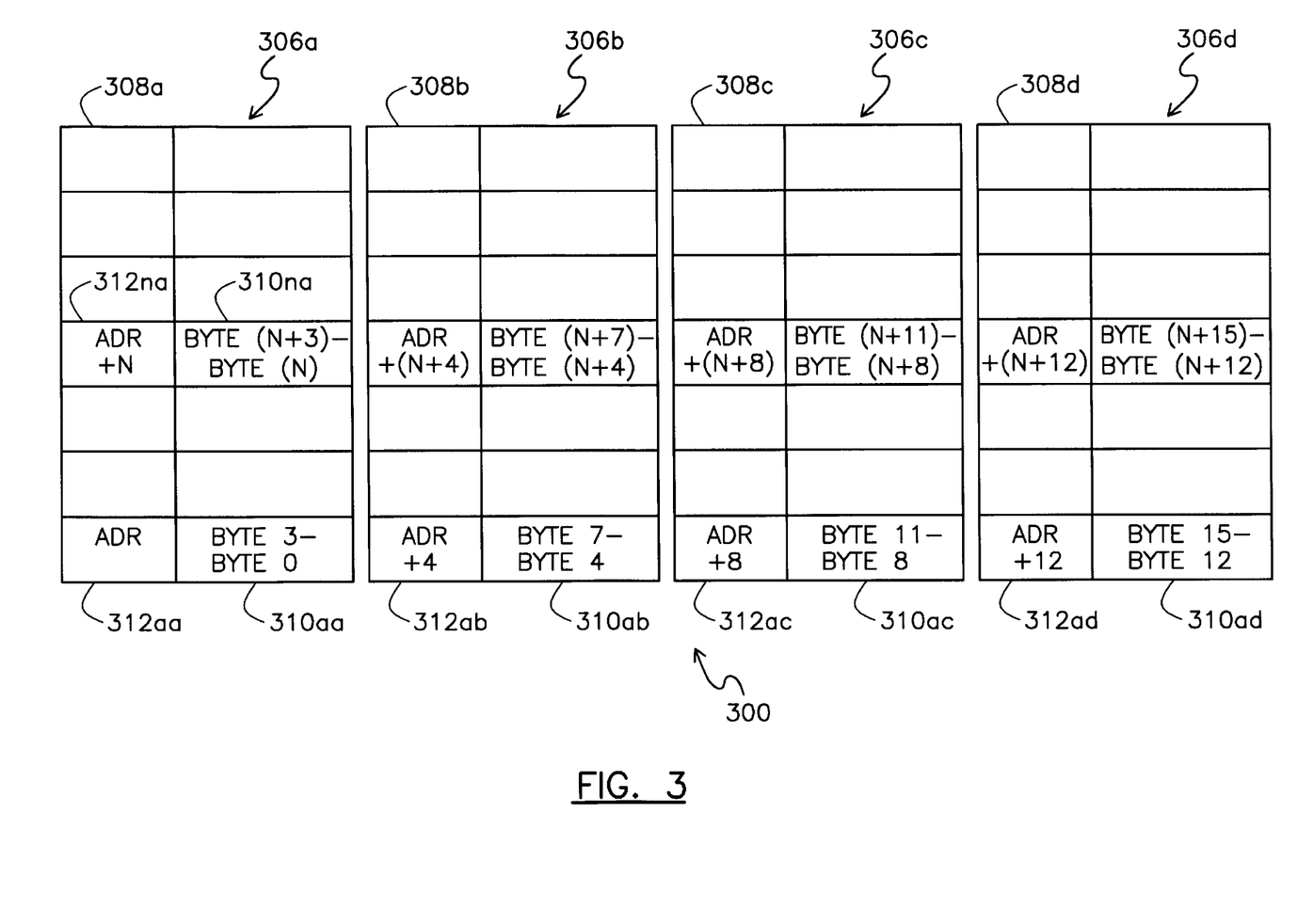
FIG. 3 is a conceptual diagram of the organization of a set associative cache memory.

Referring to FIG. 3, a conceptual diagram of the organization of a set associative cache memory is illustrated. The cache memory set illustrated in FIG. 2 and discussed above may be replicated into more sets of cache memory. Cache memory sets 306a–d each have associated tag blocks 308a–d. This cache memory, generally illustrated by the numeral 300, is a set associative organization (though any type of cache organization will work with the present invention and is contemplated herein). The cache memory 300 is divided into four sets, though two or more sets will work and are contemplated in the present invention.

The sets of the cache memory 300 are denoted by reference numeral 306. Lines 310 contained within each set 306 and the physical addresses of the contents thereof are specified by the associated tags 312. Information bytes from the main memory 108 are spread out over the four sets (ways) of the cache and are not as susceptible to being written over when a cache replacement becomes necessary. As described above for the cache memory of FIG. 2, the addresses in the tag lines 312 represent the physical addresses in main memory 108 that the information bytes now stored in the cache lines 310 are from.

The main memory 108 (FIG. 2) comprises a plurality of memory locations having physical addresses 204. The information required for all active process threads must pass through the cache memory lines 310. The processor 102 utilizes the cache memory lines 310 to rapidly access data and instruction information for the execution of the process thread. Preferably, whenever the processor 102 issues a request for data and instruction information, a cache memory controller (not illustrated) checks to see if the requested information is already in the cache lines 310. If so, the processor 102 rapidly processes the information from the fast access cache memory 300. When the requested information is not in the cache lines 310, there is a "cache miss." The overall execution time for the processor 102 is slower when a cache miss occurs because the processor must access the slower main memory 108 to retrieve the necessary process thread information therefrom.

Figure 4:
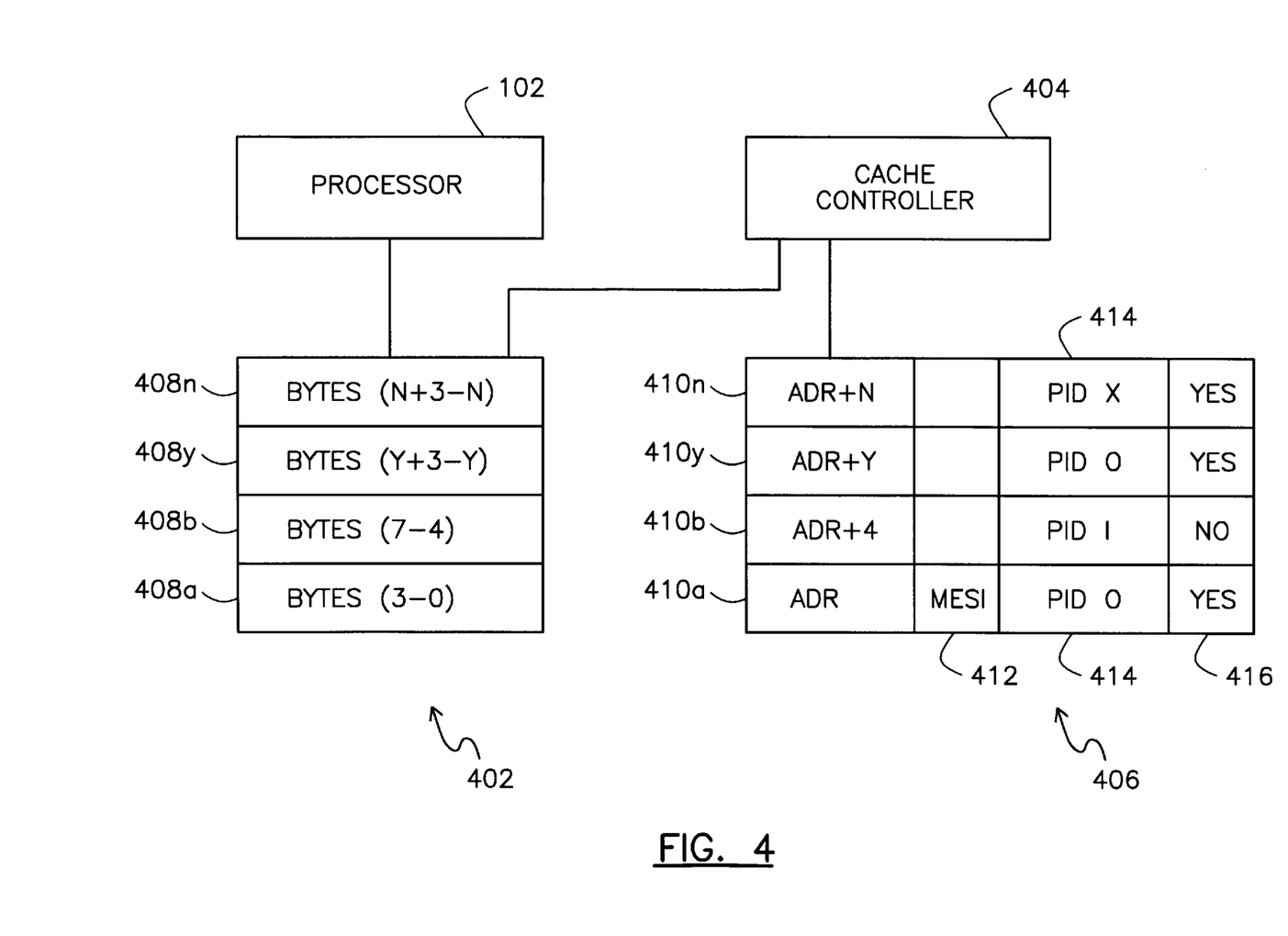
FIG. 4 is a schematic block diagram of a cache memory according to the present invention.

Referring now to FIG. 4, a schematic block diagram of a cache memory according to the present invention is illustrated. A cache memory set 402 is connected to a processor 102, a cache controller 404 and an associated tag block 406. The cache set 402 functions in the same way as the cache sets 106 (FIG. 2) and 306 (FIG. 3), and may be set associative like cache 300 (FIG. 3). Each line 408 of the cache set 402 stores process thread information. The tag block 406 stores physical addresses 410 and MESI status 412 for each line 408 of the cache 402, as described herein above.

The method and system of the present invention expands the information stored in the tag block 406 by adding storage space for process thread identification 414 for each cache line, and optionally, a process active status bit 416. Each time information for a process thread is loaded into a line 408 of the cache memory 402, the tag block 406 is updated with the physical addresses of the information bytes from the main memory 108 and process identification ("PID") indicating which process thread owns the information in the corresponding cache line. According to the present invention, so long as process thread information is stored in a cache line, the corresponding tag line will store the physical addresses of the information, the PID, and, optionally, the active status of the process thread. Alternatively, it is contemplated that the cache controller 404 could scan the cache memory looking for cache lines containing discontinued process thread information, and when finding such a line, set the respective MESI register 212 to invalid (see FIG. 2).

An additional embodiment according to the present invention is flagging a discontinued process thread so that the information remaining in the cache memory associated with the discontinued process thread would be the first to be replaced with new information of active process threads. An advantage in using this discontinued process thread flag feature (status bit 416) is that more efficient use of the cache memory is realized since some of the ambiguous randomness of typical replacement schemes is thus circumvented. In the preferred embodiment of the invention circuitry in each level of the cache controllers would be available to cycle through the cache memory to search for and invalidate cache lines belonging to terminated processes, either setting the status bit 416 to invalid or the MESI register 212 to invalid.

Figure 5:
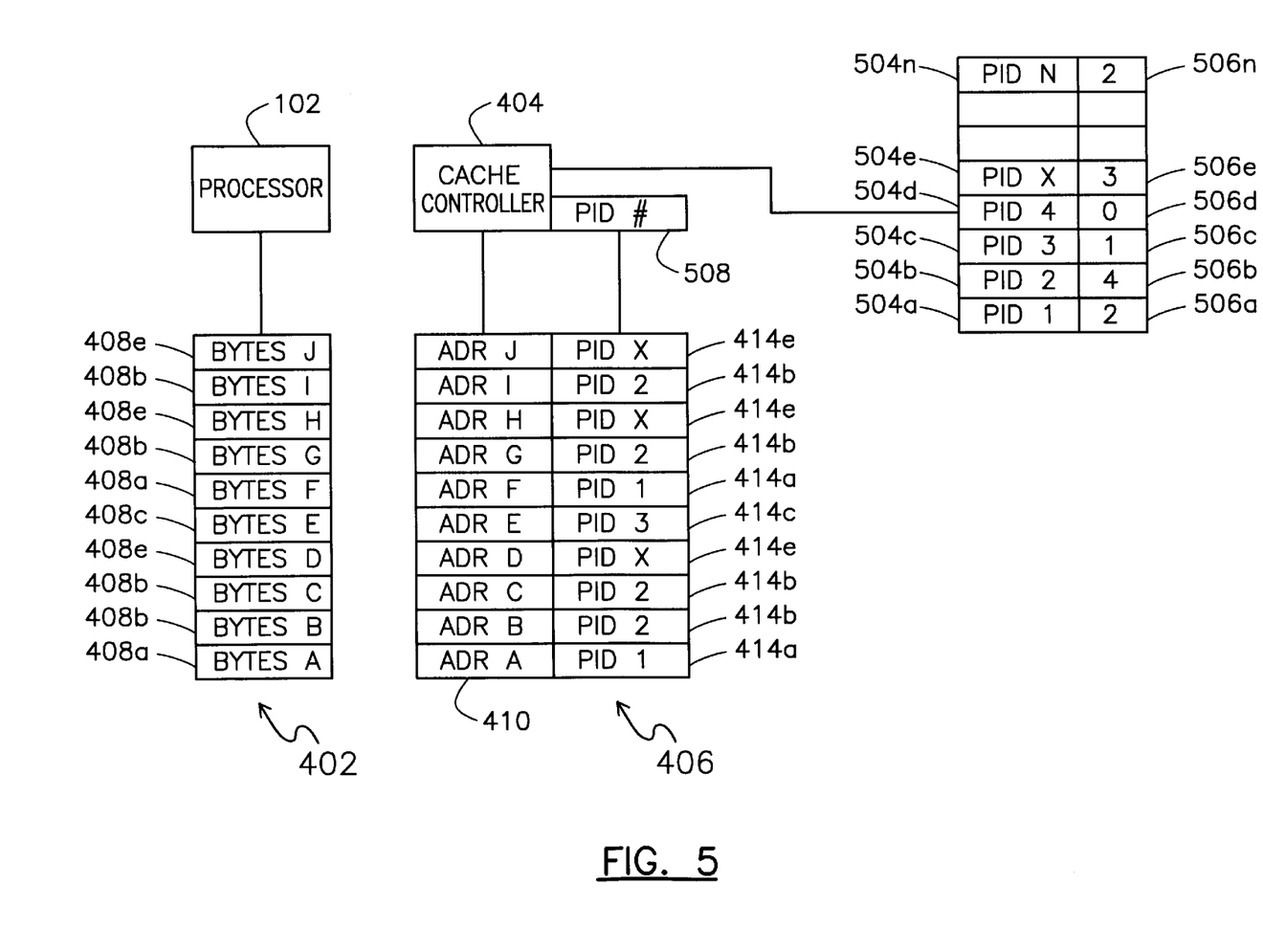
FIG. 5 is a schematic block diagram of the present invention.

Referring now to FIG. 5, a schematic block diagram of an embodiment of the present invention is illustrated. The cache memory set 402 may be a single or multiple set associate memory with the tag block 406 containing both physical addresses 410 and PIDs 414 for each of the process threads active in the computer system. A plurality of PID registers 504 are used to keep track of the number of cache lines 408 having information owned by each of the process threads that are active in the computer system. A "running PID" register 508 stores the PID number for the process thread being executed by the processor 102.

The registers 504 store the number of cache lines 408 having information that are owned by each of the process threads active in the computer system. The contents 506*a–n* of each of the registers 504*a–n*, respectively, may be read by the scheduler algorithm software and preferably may also be written to by the scheduler. Each time a cache line 408 is written with information for a process thread, the corresponding physical address of the information is stored in tag line 410 and the number of the process thread that owns the information is also stored in tag 414. The scheduler algorithm software assigns a PID number for each process thread that is active in the computer system.

An embodiment of the present invention reads the contents 506 of the PID registers 504 and uses the information to determine the optimum order in which the process threads should be executed. As an example, if a processor is available and a process exists with much of its information already loaded into that processor's cache memory, then it may be a good choice to schedule it next on that processor.

An analogy may be made that the contents 506 of the PID registers 504 are the temperatures of the respective process threads. The larger the number of cache lines used by a process thread, the hotter its temperature. Conversely, the fewer the number of cache lines used by a process thread, the colder its temperature. Another way of analogizing the process threads in context with the number of lines used in cache memory is to keep "score" of the number of cache lines having information owned by a process thread. Thus, the PID registers 504 may also be referred to as the "scoreboard registers" since the larger the "score" the better the chance that the related process thread will win first place in being executed by the processor. Note that the amount of data that a thread uses varies depending on the nature of the thread. It may be useful to "normalize" these numbers. A thread may be 'hot' even though it has less information in the cache than another thread that is "cold."

Also contemplated in the present invention are multiple levels of cache memory (see FIG. 1, caches 104, 106, 107). PID registers for each level of cache may be utilized in determining the temperature of each process for each cache level. A preferred embodiment of the present invention utilizes PID registers 504 that normalize the number of cache lines storing information for each of the process threads. A disclosed above, the total number of lines of cache memory used to store information for a running process thread may be stored in either a hardware peak value register or stored as a software value, while the PID register 504 contains the actual number of cache memory lines containing information for its respective process thread.

The peak value register always stores the maximum value of cache lines from the PID register, i.e., when the PID register increments to a number value greater than the number value of the peak value register, the peak value register updates to maintain the maximum number of cache lines storing information for a running process thread. During the time this process thread is not running, the number of cache memory lines storing information thereof may be reduced due to other running process threads overwriting some of the cache lines. The present invention can normalize the number value in each PID register 504 by dividing it with the peak number value stored in the peak value register. This gives the normalized or percentage value for each process thread which, as discussed above, may be more representative of the temperatures for the information of the process threads remaining in the cache memory.

Figure 6:
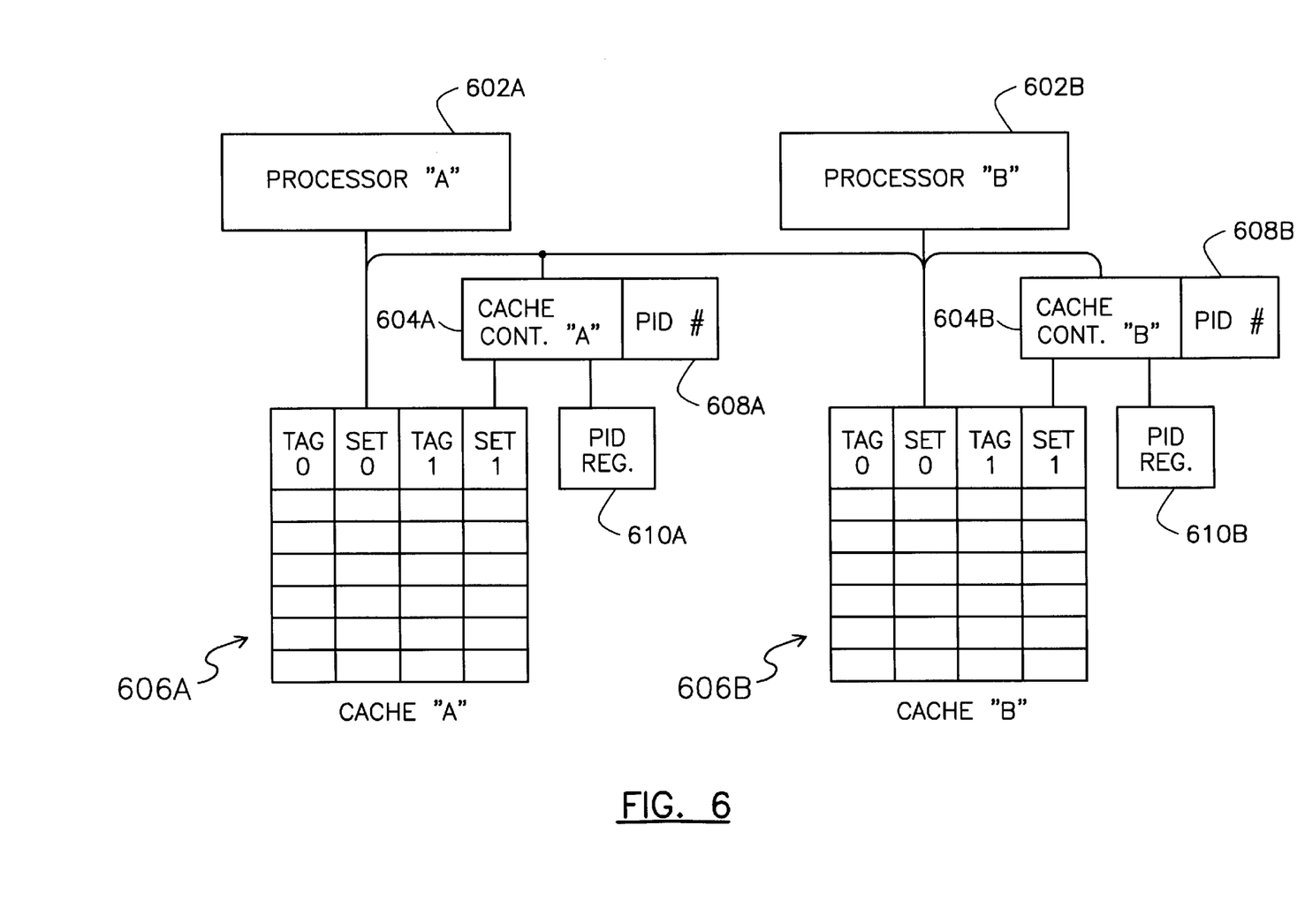
FIG. 6 is a schematic block diagram of a multi-processor embodiment of the present invention.

The system and method illustrated in FIG. 5 and disclosed above may be applied to a multi-processor computer system having multi-way set associative cache memories for each of the multi-processors. Referring now to FIG. 6, a schematic block diagram of a multi-processor embodiment of the present invention is illustrated. Two processors 602A and 602B are illustrated for clarity, but any number of processors may be utilized with the present invention. Each of the processors 602A and 602B have a two way set associative cache memory 606A and 606B, respectively. It is contemplated by the present invention to use any number of ways for set associative cache memories. In addition, any type of cache memory will benefit from an embodiment of the present invention when used in conjunction with a single or multiprocessor computer system.

In the embodiment illustrated in FIG. 6, cache controllers 604A and 604B include the PID scoreboard registers 608A and 608B, and running PID registers 610A and 610B, respectively. Operation of each of the scoreboard registers 608A and 608B, and running PID registers 610A and 610B are as described for registers 504 and 508 of FIG. 5. The set associative caches 606A and 606B operate as described for the cache memory 300 of FIG. 3, and the single processor embodiment of the present invention illustrated in FIG. 4 as described hereinabove.

The scoreboard registers 608A and 608B may also be a separate application specific integrated circuit (ASIC), or integrated within the microprocessor glue logic. Information bits are added to the tag words to facilitate tracking the number of lines in the cache memory associated with a particular process thread. As an example, eight additional bits in a tag word allows tracking of 256 process threads with the method and system of the present invention. The scheduler algorithm assigns each active process thread a label having a unique binary value from 0d (decimal—$base_{10}$) to 255d. This label is part of the tag address for as long as the associated process thread information remains in the cache memory. Additionally, the status bit, as discussed above, may be implemented to indicate whether the process is active or inactive, and may be used in determining whether the associated cache line should be written over with information for another process thread. This implementation is replicated for each processor cache in a multiprocessor computer system. This can be accomplished several ways and is contemplated herein for all purposes. A status bit indicating the state of the process (live or dead) could be added to the tag information for the cache line. This same goal could be accomplished by simply marking the cache line as "Invalid" if the cache controller conformed to the MESI convention. For example, when a cache line containing information of an invalid process thread is found, either the MESI register 212 (FIG. 2) is set to invalid or the active status bit 416 (FIG. 4) is set to invalid by the cache controller. The cache controller 604 may do this in a "background" mode and thus not significantly impact the operation of running thread(s).

The present invention, therefore, is well adapted to carry out the objects and attain the ends and advantages mentioned, as well as others inherent therein. While presently preferred embodiments of the invention and various aspects thereto have been given for purposes of disclosure, numerous changes in the details of construction, interconnection and arrangement of parts will readily suggest themselves to those skilled in the art and which are encompassed within the spirit of the invention and the scope of the appended claims.

While the present invention has been depicted, described, and is defined by reference to particularly preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having cached multi-thread processes, said system comprising:

a processor;

a cache memory connected to said processor, said cache memory having a plurality of memory lines;

a main memory connected to said cache memory;

a cache memory controller for transferring a predetermined number of bytes of information for active process threads from said main memory to said cache memory;

a plurality of scoreboard registers, each of the active process threads assigned to corresponding ones of said plurality of scoreboard registers, wherein each of the corresponding ones of said plurality of scoreboard registers store a number value representing the number of said cache memory lines that contain information for each of the plurality of active process threads;

logic circuits making available the number value in each of said plurality of scoreboard registers to a software operating system scheduler program, and logic circuits in said cache memory controller that identify certain ones of said cache memory lines that contain information for discontinued process threads so that these certain ones may be reused before other ones of said cache memory lines containing information for active process threads are reused.

2. The computer system of claim 1, wherein:

said cache memory lines are identified by process thread identification numbers according to the process thread information stored therein; and said plurality of scoreboard registers being identified by the process thread identification numbers according to the active process threads assigned thereto.

3. The computer system of claim 1, wherein said processor is a plurality of processors.

4. The computer system of claim 1, wherein said cache memory is a plurality of cache memories.

5. The computer system of claim 4, wherein said cache memory controller is a plurality of cache memories controllers, each one of said plurality of cache memory controllers controlling a respective one of said plurality of cache memories.

6. The computer system of claim 1, wherein the certain ones of said cache memory lines are identified with a status bit in an associated tag block.

7. The computer system of claim 1, wherein said cache memory controller marks the certain ones of said cache memory lines as invalid.

8. The computer system of claim 2, further comprising a register containing the process thread identification number of the active process being executed by said processor.

9. The computer system of claim 1, wherein the number value in each of said plurality of scoreboard registers increments when information is stored in corresponding lines of said cache memory.

10. The computer system of claim 1, wherein the number value in each of said plurality of scoreboard registers decrements when information is deleted in corresponding lines of said cache memory.

11. The computer system of claim 1, wherein the number of predetermined bytes of information transferred to said cache memory lines is selected from the group of numbers consisting of $2^n$ where n is an integer number from 1 to 16.

12. The computer system of claim 1, further comprising:
   logic circuits for storing maximum number values representing the greatest number of said cache memory lines that contain information for each of the plurality of active process threads; and
   logic circuits for dividing the number values in each of said plurality of scoreboard registers by the maximum number values so as to normalize the number values into a percentage from 0 to 100 percent.

13. A multi-processor computer system having cached multi-thread processes, said system comprising:
   a plurality of processors;
   a plurality of cache memories, at least one of each of said plurality of cache memories associated with each of said plurality of processors, and each of said plurality of cache memories having a plurality of memory lines;
   a main memory connected to said plurality of cache memories;
   a plurality of cache memory controllers, one for each of said plurality of processors, said plurality of cache memory controllers transferring a predetermined number of bytes of information for active process threads from said main memory to said plurality of cache memories;
   a plurality of scoreboard registers, each of the active process threads assigned to corresponding ones of said plurality of scoreboard registers, wherein each of the corresponding ones of said plurality of scoreboard registers store a number value representing the number of the memory lines for each of said plurality of cache memories that contain information for each of the active process threads, wherein the number value stored in each of said plurality of scoreboard registers is available to a software operating system scheduler program, and logic circuits in each of said plurality of cache memory controllers that identify certain ones of said cache memory lines that contain information for discontinued process threads so that these certain ones may be reused before other ones of said cache memory lines containing information for active process threads are reused.

14. The computer system of claim 13, wherein:

the memory lines of said plurality of cache memories are identified by process thread identification numbers according to the process thread information stored therein; and said plurality of scoreboard registers being identified by the process thread identification numbers according to the active process threads assigned thereto.

* * * * *